US012742513B2

(12) United States Patent
Wingfield

(10) Patent No.: US 12,742,513 B2
(45) Date of Patent: Sep. 22, 2026

(54) APPARATUS FOR SUPPORTING AT LEAST A PART OF AN ENGINE

(71) Applicant: Rolls-Royce plc, London (GB)

(72) Inventor: Michael J Wingfield, Derby (GB)

(73) Assignee: ROLLS-ROYCE plc, London (GB)

( * ) Notice: Subject to any disclaimer, the term of this patent is extended or adjusted under 35 U.S.C. 154(b) by 21 days.

(21) Appl. No.: 18/924,285

(22) Filed: Oct. 23, 2024

(65) Prior Publication Data

US 2025/0164061 A1 May 22, 2025

(30) Foreign Application Priority Data

Nov. 16, 2023 (GB) ..................................... 2317546
Nov. 16, 2023 (GB) ..................................... 2317547

(51) Int. Cl.
*F01D 25/28* (2006.01)
*F16M 5/00* (2006.01)
*G01P 15/00* (2006.01)

(52) U.S. Cl.
CPC ............... *F16M 5/00* (2013.01); *G01P 15/00* (2013.01)

(58) Field of Classification Search
CPC ......... F01D 25/285; G01P 15/00; F16M 5/00; F05D 2260/83; F05D 2270/80; G01M 15/14
See application file for complete search history.

(56) References Cited

U.S. PATENT DOCUMENTS 6,298,536 B1 * 10/2001 Rossway ............... F01D 25/285 29/281.6
10,920,621 B2 * 2/2021 Murphy ................ F01D 25/285
2006/0164239 A1 7/2006 Loda
2008/0023618 A1 * 1/2008 McGloghlon ........ B25H 1/0007 248/646
2013/0324148 A1 12/2013 Geib et al.
2018/0134301 A1 5/2018 Dudar
2019/0034863 A1 1/2019 Winkle et al.
2019/0235092 A1 8/2019 Bastian, II et al.
2020/0307776 A1 10/2020 Coco et al.
2022/0032412 A1 2/2022 Prendergast et al.
2022/0180279 A1 6/2022 Whitman et al.

FOREIGN PATENT DOCUMENTS

CN 102774576 B 12/2014
FR 3099919 A1 2/2021
GB 2526626 A 12/2015
JP 2019-515405 A 6/2019
KR 2021-0142857 A 11/2021

OTHER PUBLICATIONS

May 14, 2024 Combined Search and Examination Report issued in British Patent Application No. GB2317546.6.
May 13, 2024 Combined Search and Examination Report issued in British Patent Application No. GB2317547.4.

* cited by examiner

*Primary Examiner* — Bradley Duckworth
(74) *Attorney, Agent, or Firm* — Oliff PLC

(57) ABSTRACT

Apparatus for supporting at least a part of an engine, the engine comprising: an engine stand configured to support at least a part of an engine; an accelerometer coupled to the engine stand and configured to: measure acceleration of the engine stand, and generate accelerometer data; and a first processor configured to receive the accelerometer data from the accelerometer.

13 Claims, 6 Drawing Sheets

APPARATUS FOR SUPPORTING AT LEAST A PART OF AN ENGINE

CROSS REFERENCE TO RELATED APPLICATIONS

This application claims priority pursuant to 35 U.S.C. 119(a) to United Kingdom Patent Application Number 2317546.6 filed on Nov. 16, 2023, the entire contents of which are incorporated herein by reference.

This application also claims priority pursuant to 35 U.S.C. 119(a) to United Kingdom Patent Application Number 2317547.4 filed on Nov. 16, 2023, the entire contents of which are incorporated herein by reference.

FIELD

This disclosure relates to apparatus for supporting at least a part of an engine.

BACKGROUND

Engines, such as gas turbine engines, may be supported by an engine stand. For example, when a gas turbine engine is removed from an aircraft, the gas turbine engine may be mounted on, and attached to an engine stand to enable the gas turbine engine to be transported to a maintenance facility for servicing. The engine may experience various different conditions during transportation which may affect the handling, servicing, and operation of the engine at the maintenance facility or when being returned to the aircraft. However, the maintenance facility and the airline may receive little to no quantitative information on the conditions experienced by the engine while it is being supported by the engine stand.

SUMMARY

According to a first aspect there is provided apparatus for supporting at least a part of an engine, the apparatus comprising: an engine stand configured to support at least a part of an engine; an accelerometer coupled to the engine stand and configured to measure acceleration of the engine stand and generate accelerometer data; and a first processor coupled to the engine stand configured to receive the accelerometer data from the accelerometer.

The engine stand may comprise: a base frame, an engine support frame, and a shock absorber coupled between the base frame and the engine support frame. The accelerometer may be coupled to the engine support frame.

The apparatus may further comprise a first memory. The first processor may be configured to control the first memory to store the received accelerometer data.

The apparatus may further comprise a first transmitter. The first processor may be configured to control the first transmitter to transmit the accelerometer data.

The apparatus may further comprise a remote computer configured to receive the accelerometer data from the first transmitter. The remote computer may be configured to perform an action in response to the measured acceleration exceeding a threshold acceleration value.

The apparatus may further comprise a global navigation satellite system (GNSS) sensor coupled to the engine stand. The global navigation satellite system sensor may be configured to determine a location of the engine stand.

The apparatus may further comprise a first housing configured to house at least the accelerometer and the first processor.

The apparatus may further comprise an interface plate configured to attach to the engine stand. The first housing may be configured to couple to the engine stand via the interface plate.

The apparatus may further comprise a humidity sensor coupled to the engine stand. The humidity sensor may be configured to measure humidity at the engine stand and generate humidity data.

The apparatus may further comprise: a second transmitter; and a second processor configured to receive the humidity data from the humidity sensor and control the second transmitter to transmit the humidity data.

The apparatus may further comprise a temperature sensor coupled to the engine stand. The temperature sensor may be configured to measure temperature at the engine stand, and generate temperature data.

The apparatus may further comprise a photodetector coupled to the engine stand and configured to measure optical light at the engine stand, and generate light data.

The apparatus may further comprise a position sensor coupled to the engine stand and configured to measure a parameter associated with the presence of an engine being supported by the engine stand and generate engine position data.

The apparatus may further comprise: an accessory of the engine stand; and a third transmitter coupled to the accessory. The third transmitter may be configured to transmit a signal to indicate the presence of the accessory.

According to a second aspect there is provided a method comprising: receiving data generated by a sensor coupled to an engine stand; determining if a measured value in the received data exceeds a threshold value; and controlling performance of an action in response to determining that the measured value exceeds the threshold value.

Controlling performance of an action may include controlling an output device to provide an output in response to the determining that the measured value exceeds the threshold value.

The output device may comprise a loudspeaker. The output may comprise an audible alarm.

The output device may comprise a display. The output may comprise a visual alarm.

Determining if a measured value in the received data exceeds a threshold value may include determining if a measured acceleration value is greater than a threshold acceleration value.

Determining if a measured value in the received data exceeds a threshold value may include determining if a measured location falls outside of a threshold location.

Determining if a measured value in the received data exceeds a threshold value may include determining if a temperature value is greater than a threshold temperature value.

Determining if a measured value in the received data exceeds a threshold value may include determining if a measured humidity value is greater than a threshold humidity value.

Determining if a measured value in the received data exceeds a threshold value may include determining if a measured light value is greater than a threshold light value.

Determining if a measured value in the received data exceeds a threshold value may include determining if a measured engine position value is less than a threshold engine position value.

According to a third aspect there is provided an apparatus comprising: at least one processor; at least one memory comprising computer readable instructions; the at least one processor being configured to read the computer readable instructions to cause performance of the method as described in any of the preceding paragraphs.

According to a fourth aspect there is provided a computer program that, when read by a computer, causes performance of the method as described in any of the preceding paragraphs.

According to a fifth aspect there is provided a non-transitory computer readable storage medium comprising computer readable instructions that, when read by a computer, cause performance of the method as described in any of the preceding paragraphs.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
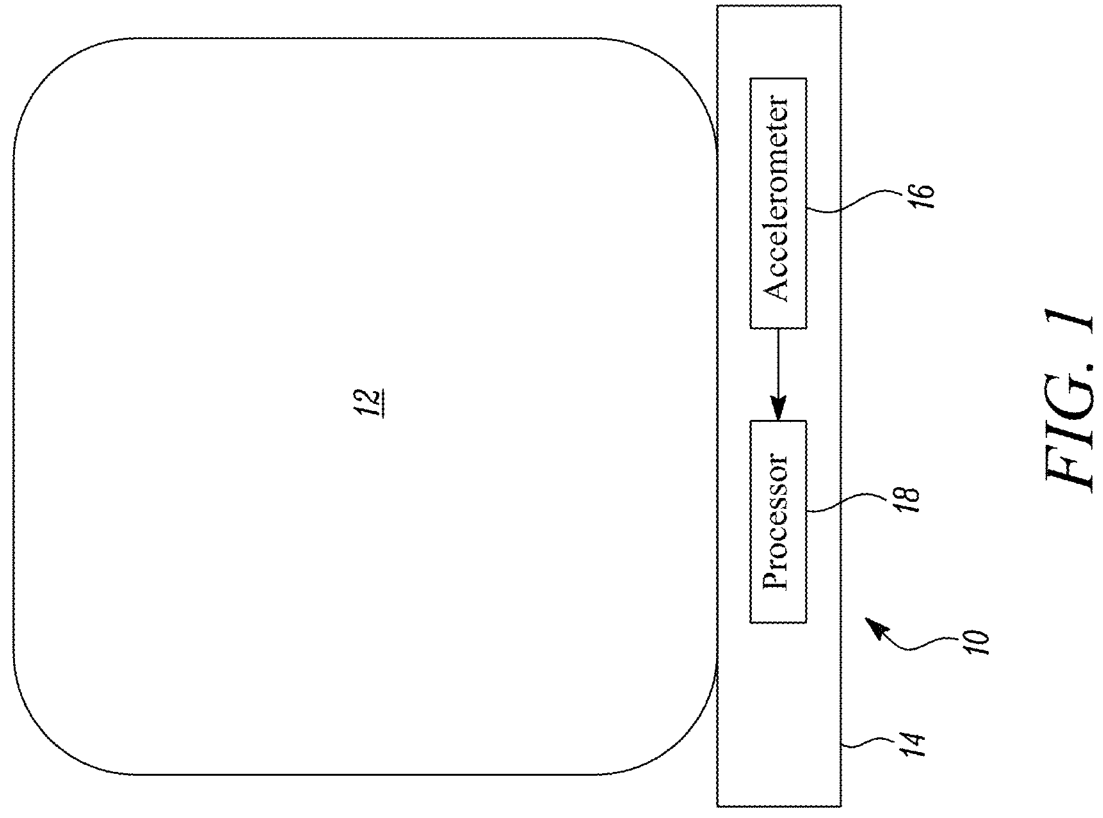
FIG. 1 illustrates a schematic diagram of an apparatus for supporting at least a part of an engine according to an example.

FIG. 1 illustrates a schematic diagram of an apparatus 10 for supporting at least a part of an engine 12. The apparatus 10 includes an engine stand 14, an accelerometer 16 and a processor 18. In some examples, the apparatus 10 may be a module. As used herein, the word 'module' refers to a device or apparatus where one or more components are included at a later time and, possibly, by another manufacturer or by an end user. For example, where the apparatus 10 is a module, the apparatus 10 may only include the engine stand 14, the accelerometer 16 and the processor 18 and other features (such as memory) may be added by another manufacturer, or by an end user.

The engine 12 may be a heat engine such as a gas turbine engine, a reciprocating engine (which may also be known as a piston engine), a rocket engine or a nuclear reactor. Alternatively, the engine 12 may be an electrical motor, a pneumatic motor or a hydraulic motor. A part of the engine 12 may be one or more components or sub-systems of an engine 12. For example, a part of a gas turbine engine may be a fan module that includes a fan case and a fan, but excludes an engine core of the gas turbine engine (that is, the fan module does not include combustion equipment and a turbine). By way of another example, a part of a gas turbine engine may be an engine core of a gas turbine engine that includes combustion equipment, and a turbine, but excludes the fan module (that is, the engine core does not include a fan case and a fan).

The engine stand 14 is configured to support at least a part of the engine 12. For example, the engine 12 (or part of the engine) may rest on the engine stand 14 and be held in a stationary position relative to the engine stand 14 through frictional contact with the engine stand and one or more clamping devices. Additionally, or alternatively, the engine 12 (or part of the engine) may be held in a stationary position relative to the engine stand 14 by one or more fasteners that couple the engine 12 to the engine stand 14. For example, one or more screws may extend through the engine stand 14 and into the engine 12 and thereby attach the engine 12 to the engine stand 14.

The accelerometer 16 may be any suitable device that is configured to measure proper acceleration (that is, the acceleration of the accelerometer in its own instantaneous rest frame) and is configured to generate accelerometer data. For example, the accelerometer 16 may be a piezoelectric accelerometer, a piezoresistive accelerometer, a capacitive accelerometer, or a micro-electro-mechanical systems (MEMS) accelerometer.

The accelerometer 16 may be coupled to the engine stand 14 or may be integrated with the engine stand 14. For example, the accelerometer 16 may be housed in a housing that is coupled to the engine stand 14 via one or more fasteners (such as screws, or nuts and bolts) and/or via an adhesive such as glue. Where the accelerometer 16 is integrated with the engine stand 14, the accelerometer 16 may not be housed in a dedicated housing and instead, the engine stand 14 may form a housing for the accelerometer 16.

The processor 18 is coupled to the engine stand 14 and is configured to receive the accelerometer data from the accelerometer 16. The processor 18 may comprise any suitable circuitry to cause performance of the methods described herein. For example, the processor 18 may comprise: at least one application specific integrated circuit (ASIC); and/or at least one field programmable gate array (FPGA); and/or single or multi-processor architectures; and/or sequential/parallel architectures; and/or at least one programmable logic controllers (PLCs); and/or at least one microprocessor; and/or at least one microcontroller; and/or a central processing unit (CPU); and/or a graphics processing unit (GPU), to perform the methods.

The processor 18 may be coupled to the engine stand 14 or may be integrated with the engine stand 14. For example, the processor 18 may be housed in a housing that is coupled to the engine stand 14 via one or more fasteners (the processor 18 may be housed in the same housing as the accelerometer 16). Where the processor 18 is integrated with the engine stand 14, the processor 18 may not be housed in a dedicated housing and instead, the engine stand 14 may form a housing for the processor 18. Where the accelerometer 16 is a micro-electro-mechanical systems (MEMS) accelerometer, the processor 18 may be a part of the accelerometer 16.

In use, an engine 12 may be supported by the engine stand 14 and may be transported between different locations (for example, between an aircraft and a maintenance facility). During use, the engine stand 14 is usually subject to various forces (for example, caused by people moving the engine stand 14) and the accelerometer 16 measures the acceleration of the engine stand and generates accelerometer data. The processor 18 receives the accelerometer data from the accelerometer 16. The processor 18 may advantageously store the accelerometer data to provide a record of the acceleration experienced by the engine stand 14 (and thus the engine 12) over a period time. Additionally, or alternatively, the processor 18 may use the accelerometer data to generate an alarm (for example, where the measured acceleration exceeds a threshold acceleration value). The alarm may advantageously cause people to inspect the engine 12 and the engine stand 14 to determine whether one or both of the engine 12 and the engine stand 14 have incurred any damage.

Figure 2:
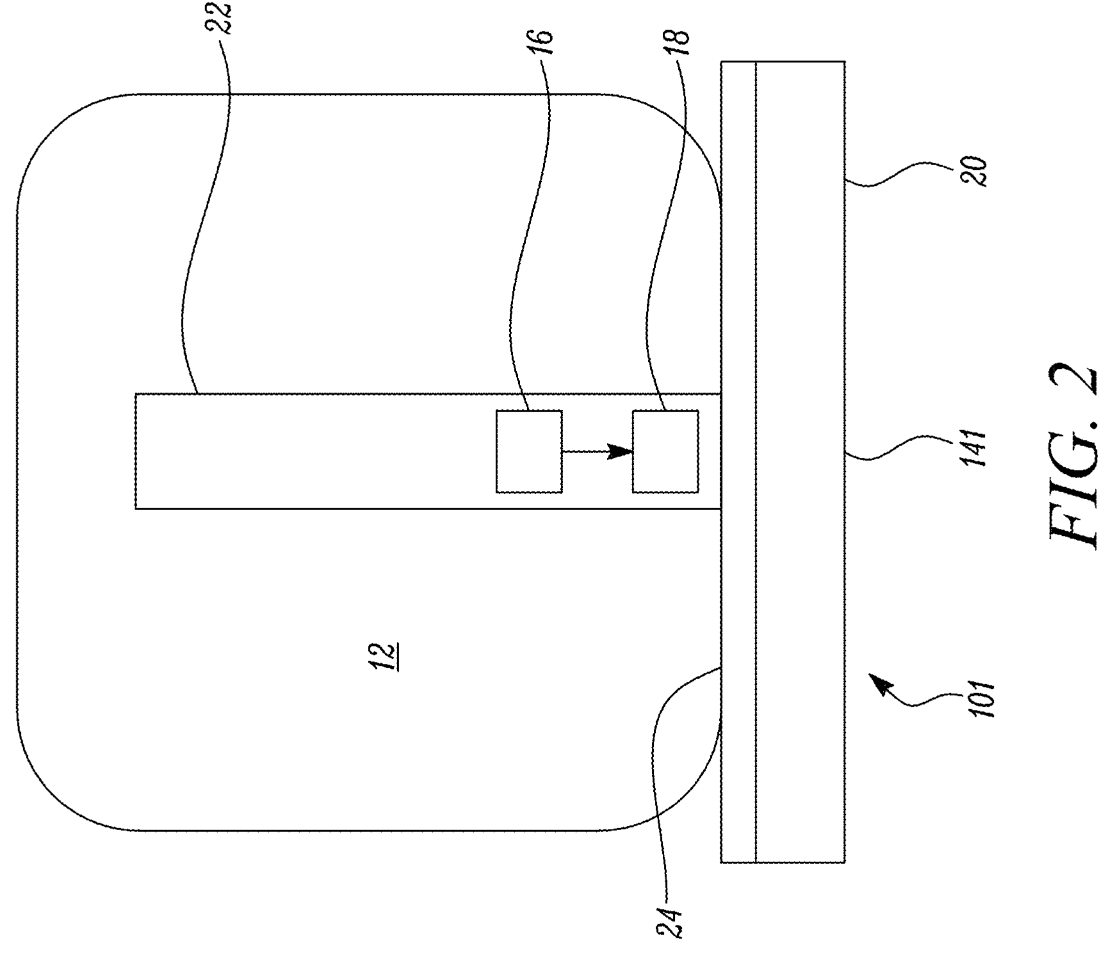
FIG. 2 illustrates a schematic diagram of an apparatus for supporting at least a part of an engine according to another example.

FIG. 2 illustrates a schematic diagram of an apparatus 101 for supporting at least a part of an engine 12 according to another example. The apparatus 101 is similar to the apparatus 10 and where the features are similar, the same reference numerals are used. The apparatus 101 includes an engine stand 141, an accelerometer 16 and a processor 18. The apparatus 101 may be a module and one or more further components (such as memory or a transceiver) may be added to the apparatus 101 at a later time by another manufacturer or by an end user.

The engine stand 141 comprises: a base frame 20, an engine support frame 22, and a shock absorber 24 coupled between the base frame 20 and the engine support frame 22. The base frame 20 is arranged to sit on the floor and may comprise wheels and/or castors that enable the engine stand 141 to be positioned on the floor (for example, by being pushed or pulled). The engine support frame 22 is arranged to support at least a part of the engine 12 and may also be referred to as an engine cradle or support pylon. The shock absorber 24 may comprise one or more of: springs, pneumatic shock absorbers, and hydraulic shock absorbers. The shock absorber 24 is configured to provide shock attenuation in the event that the engine 12 and/or the engine stand 141 are subject to a force.

The accelerometer 16 is coupled to the engine support frame 22 and this position advantageously enables the accelerometer 16 to experience similar forces to those experienced by the engine 12. The processor 18 may also be coupled to the engine support frame 22, or may be coupled to the base frame 20.

Figure 3:
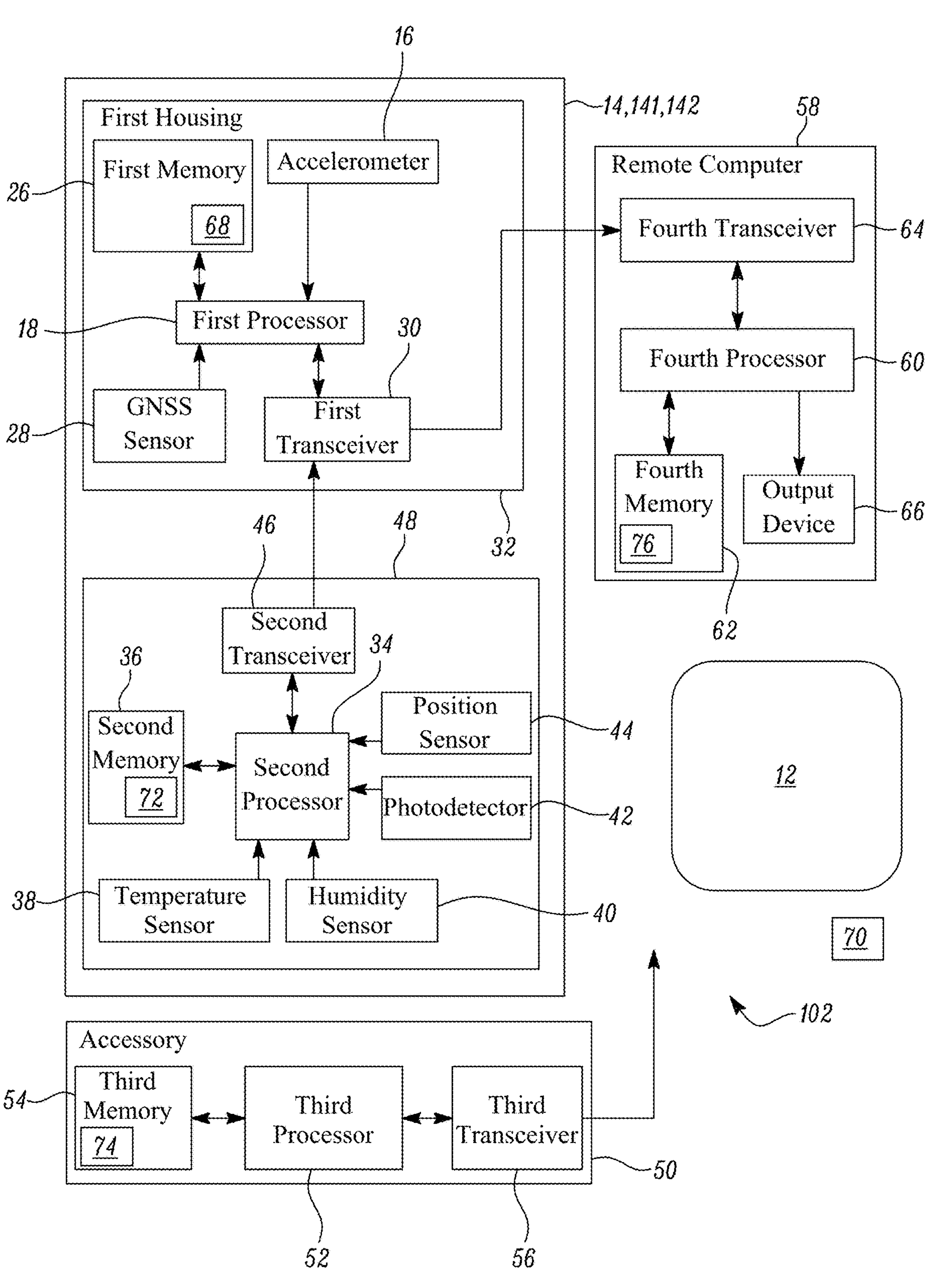
FIG. 3 illustrates a schematic diagram of an apparatus for supporting at least a part of an engine according to a further example.

FIG. 3 illustrates a schematic diagram of an apparatus 102 for supporting at least a part of an engine 12 according to a further example. The apparatus 102 is similar to the apparatus 10 and the apparatus 101 and where the features are similar, the same reference numerals are used.

Figure 4:
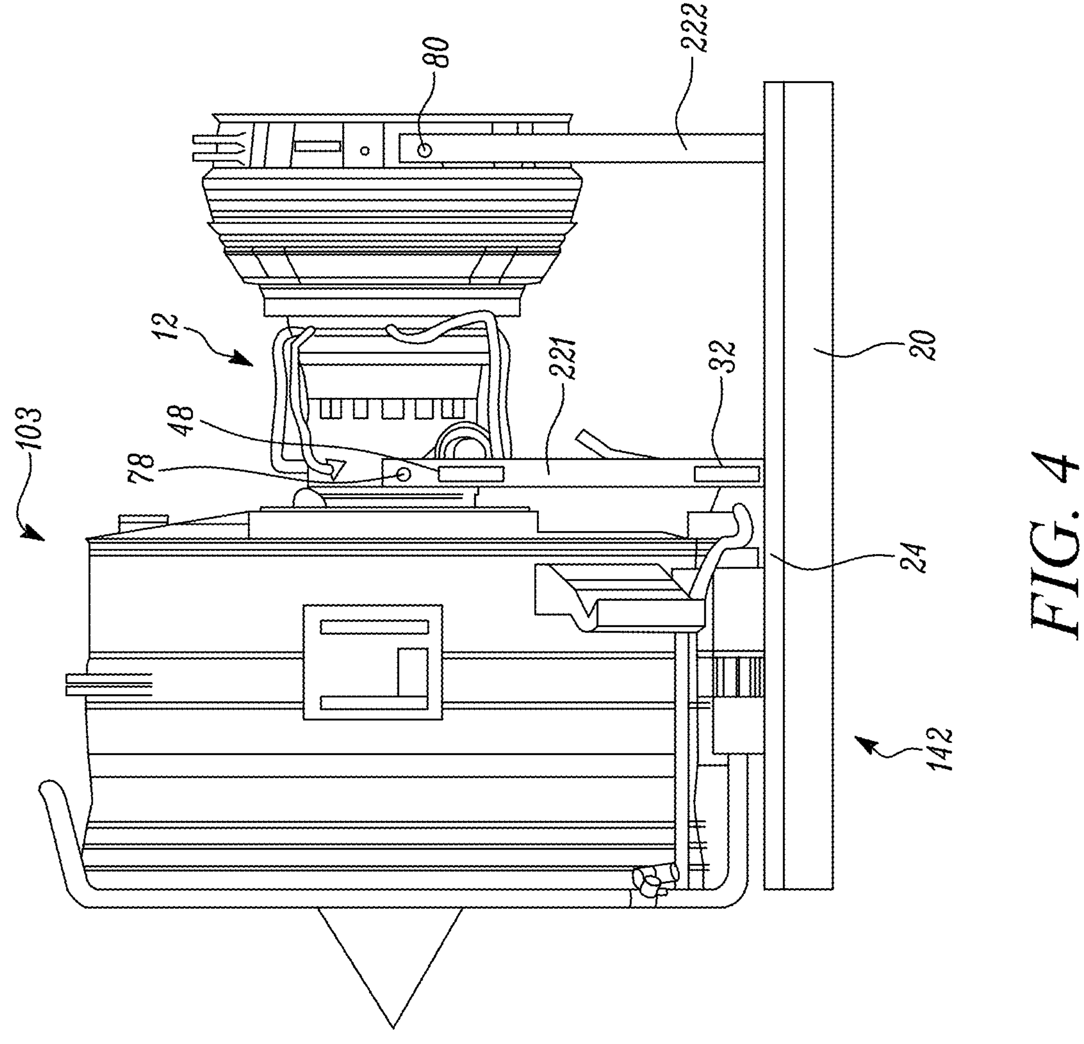
FIG. 4 illustrates a side view of an apparatus for supporting at least a part of an engine according to another example.

The apparatus 102 includes an engine stand 14, 141, 142 (the engine stand 142 is illustrated in FIG. 4 and is described in detail below). The apparatus 102 also includes an accelerometer 16, a first processor 18, a first memory 26, a global navigation satellite system sensor 28, and a first transceiver 30 that are housed in a first housing 32. Additionally, the apparatus 102 includes a second processor 34, a second memory 36, a temperature sensor 38, a humidity sensor 40, a photodetector 42, a position sensor 44, and a second transceiver 46 that are housed in a second housing 48. Furthermore, the apparatus 102 includes an accessory 50, a third processor 52, a third memory 54 and a third transceiver 56. The apparatus 102 also includes a remote computer 58 that comprises a fourth processor 60, a fourth memory 62, a fourth transceiver 64 and an output device 66.

The apparatus 102 may be a module. For example, where the apparatus 102 is a module, the apparatus 102 may only include the engine stand 14, 141, 142, the accelerometer 16 and the first processor 18 and one or more of the other components mentioned in the preceding paragraph may be added by another manufacturer, or by an end user.

The first processor 18, the second processor 34, the third processor 52 and the fourth processor 60 may comprise any suitable circuitry to cause performance of the methods described herein. For example, the first processor 18, the second processor 34, the third processor 52 and the fourth processor 60 may comprise: at least one application specific integrated circuit (ASIC); and/or at least one field programmable gate array (FPGA); and/or single or multi-processor architectures; and/or sequential/parallel architectures; and/or at least one programmable logic controllers (PLCs); and/or at least one microprocessor; and/or at least one microcontroller; and/or a central processing unit (CPU); and/or a graphics processing unit (GPU), to perform the methods.

The first memory 26, the second memory 36, the third memory 54 and the fourth memory 62 may be any suitable non-transitory computer readable storage medium, data storage device or devices, and may comprise a hard disk drive (HDD) and/or solid-state memory (such as a solid-state drive (SSD)). The first memory 26, the second memory 36, the third memory 54 and the fourth memory 62 may be permanent non-removable memory, or may be removable memory (such as a universal serial bus (USB) flash drive or a secure digital card). The first memory 26, the second memory 36, the third memory 54 and the fourth memory 62 may include: local memory employed during actual execution of the computer program; bulk storage; and cache memories which provide temporary storage of at least some computer readable or computer usable program code to reduce the number of times code may be retrieved from bulk storage during execution of the code.

The first memory 26 stores a computer program 68 comprising computer readable instructions that, when read by the first processor 18, causes performance of the methods described herein. The computer program 68 may be software or firmware, or may be a combination of software and firmware. The computer program 68 may be stored on a non-transitory computer readable storage medium 70. The computer program 68 may be transferred from the non-transitory computer readable storage medium 70 to the first memory 26. The non-transitory computer readable storage medium 70 may be, for example, a USB flash drive, a secure digital (SD) card, an optical disc (such as a compact disc (CD), a digital versatile disc (DVD) or a Blu-ray disc). In some examples, the computer program 68 may be transferred to the first memory 26 via a wireless signal or via a wired signal.

As described in the preceding paragraphs, the accelerometer 16 is configured to measure proper acceleration (that is, the acceleration of the accelerometer 16 in its own instantaneous rest frame) and is configured to generate accelerometer data. The first processor 18 is configured to receive the accelerometer data from the accelerometer 16 and may control the storage of the accelerometer data in the first memory 26.

The global navigation satellite system (GNSS) sensor 28 may comprise any suitable sensors that are configured to determine a location (longitude and latitude for example) of the global navigation satellite system (GNSS) sensor 28 on the Earth and generate location data. For example, the global navigation satellite system (GNSS) sensor 28 may be a Global Positioning System (GPS) sensor or a Galileo sensor. The first processor 18 is configured to receive the location data from the global navigation satellite system (GNSS) sensor 28 and may control storage of the location data in the first memory 26.

The first transceiver 30 may comprise any suitable communications circuitry that is configured to communicate data via a wireless link and/or via a wired link. In some examples, the first transceiver 30 may be a transmitter that is configured to transmit data. In other examples, the first transceiver 30 may include a transmitter and a receiver that are configured to transmit and receive data respectively. The first transceiver 30 may be configured to communicate over a network such as one or more of: a wide area network (WAN), a wireless wide area network (WWAN), a local area network (LAN) and a wireless local area network (WLAN). Additionally, or alternatively, the first transceiver 30 may be configured to communicate directly with another device (that is, without an intervening network between the first transceiver 30 and the other device). The processor 18 is configured to control the first transceiver 30 to transmit data. For example, the processor 18 may be configured to control the first transceiver 30 to transmit the accelerometer data. In some examples, the first processor 18 may be configured to receive data from the first transceiver 30.

Figure 5B:
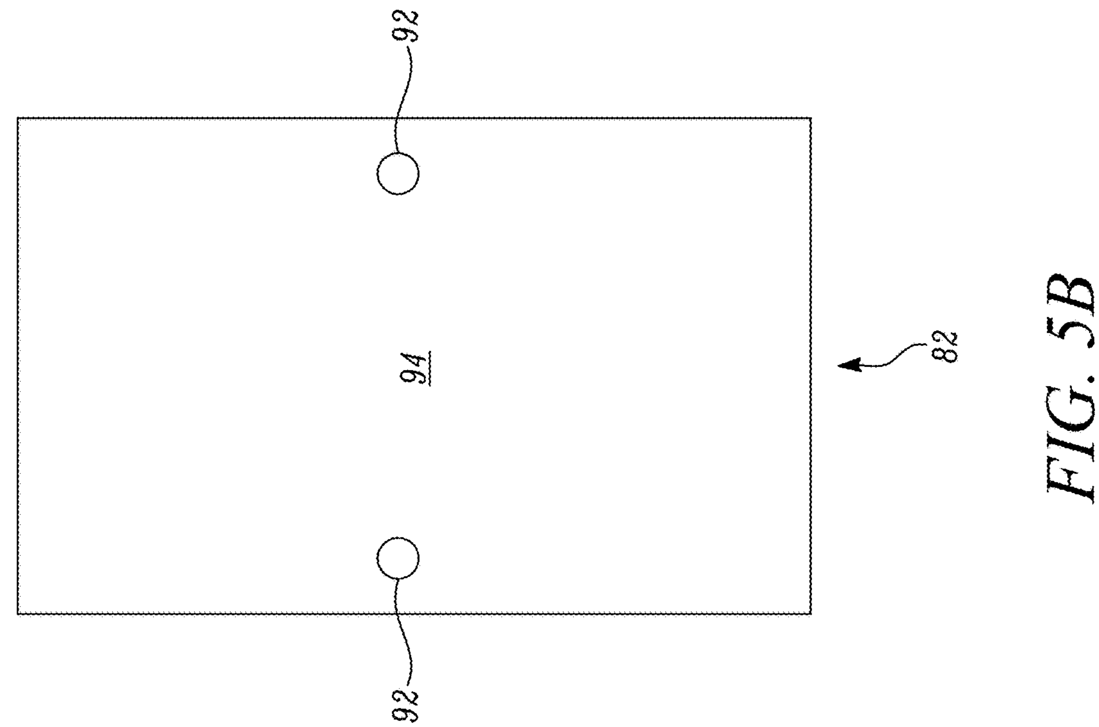
FIG. 5B illustrates a front view of the interface plate of FIG. 5A.
Figure 5A:
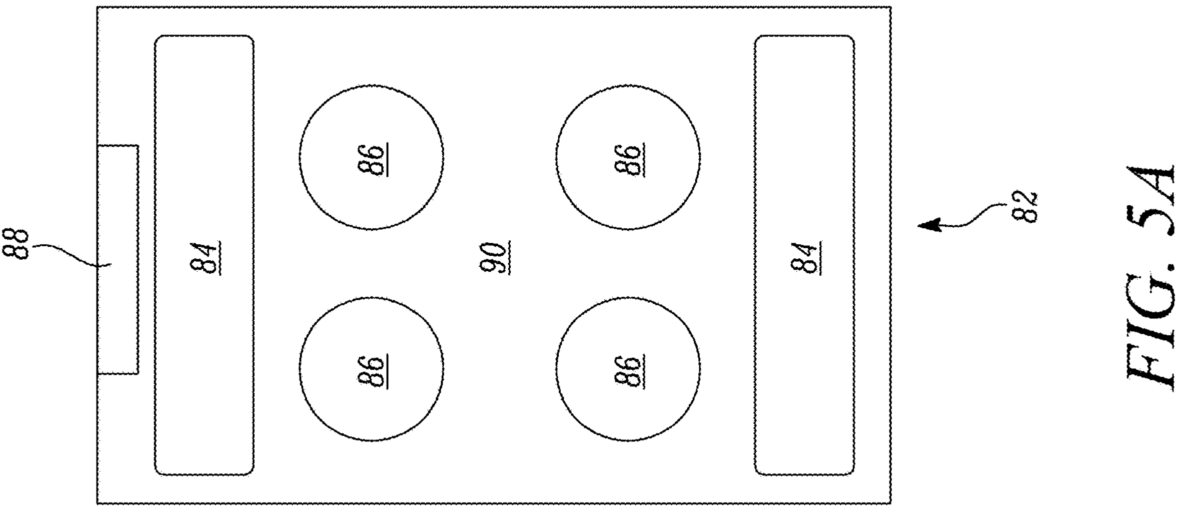
FIG. 5A illustrates a rear view of an interface plate according to an example.

The first housing 32 is arranged to house the first processor 18, the accelerometer 16, the first memory 26, the GNSS sensor 28 and the first transceiver 30. For example, the first housing 32 may be plastic case that has an internal cavity for housing the first processor 18, the accelerometer 16, the first memory 26, the GNSS sensor 28 and the first transceiver 30. The first housing 32 is coupled to the engine stand 14, 141, 142 and may be coupled via an interface plate as illustrated in FIGS. 5A, 5B and described in greater detail below.

The second memory 36 stores a computer program 72 comprising computer readable instructions that, when read by the second processor 34, causes performance of the methods described herein. The computer program 72 may be software or firmware, or may be a combination of software and firmware. The computer program 72 may be stored on a non-transitory computer readable storage medium (such as the non-transitory computer readable storage medium 70). The computer program 72 may be transferred from the non-transitory computer readable storage medium 70 to the second memory 36.

The temperature sensor 38 is configured to measure temperature at the engine stand 14, 141, 142 and generate temperature data. For example, the temperature sensor 38 may be a thermistor, a thermocouple, a resistance thermometer, or a silicon bandgap temperature sensor. The second processor 34 is configured to receive the temperature data from the temperature sensor 38 and may control the storage of the temperature data in the second memory 36. Additionally, or alternatively, the second processor 34 may be configured to control the second transceiver 46 to transmit the temperature data.

The humidity sensor 40 is configured to measure humidity at the engine stand 14, 141, 142 and generate humidity data. For example, the humidity sensor 40 may comprise any suitable hygrometer and may comprise a capacitive hygrometer, a resistive hygrometer, or an optical hygrometer. The second processor 34 is configured to receive the humidity data from the humidity sensor 40 and may control the storage of the humidity data in the second memory 36. Additionally, or alternatively, the second processor 34 may be configured to control the second transceiver 46 to transmit the humidity data.

The photodetector 42 is configured to measure optical light at the engine stand and generate light data. For example, the photodetector 42 may comprise one or more of a metal-semiconductor-metal (MSM) photodetector, photodiodes, avalanche photodiodes (APDs), phototransistors, charge-coupled devices (CCDs), complementary metal-oxide-semiconductor (CMOS) image sensors (CIS), and photomultiplier tubes (PMTs). The second processor 34 is configured to receive the light data from the photodetector 42 and may control the storage of the light data in the second memory 36. Additionally, or alternatively, the second processor 34 may be configured to control the second transceiver 46 to transmit the light data.

The position sensor 44 is configured to measure a parameter associated with the presence of an engine being supported by the engine stand 14, 141, 142 and generate engine position data. For example, the position sensor 44 may comprise an optical proximity sensor, a capacitive displacement sensor, or an inductive sensor. In other examples, the position sensor 44 may comprise an identification reader that is configured to read a passive wireless tag coupled to the engine 12 using near-field communication (NFC), radio frequency identification (RFID) or ultra-wide band (UWB). The second processor 34 is configured to receive the engine position data from the position sensor 44 and may control the storage of the engine position data in the second memory 36. Additionally, or alternatively, the second processor 34 may be configured to control the second transceiver 46 to transmit the engine position data.

The second transceiver 46 may comprise any suitable communications circuitry that is configured to communicate data via a wireless link and/or via a wired link. In some examples, the second transceiver 46 may be a transmitter that is configured to transmit data. In other examples, the second transceiver 46 may include a transmitter and a receiver that are configured to transmit and receive data respectively. The second transceiver 46 may be configured to communicate over a network such as one or more of: a wide area network (WAN), a wireless wide area network (WWAN), a local area network (LAN) and a wireless local area network (WLAN). Additionally, or alternatively, the second transceiver 46 may be configured to communicate directly with another device (that is, without an intervening network between the second transceiver 46 and the other device). As mentioned in the preceding paragraphs, the second processor 34 may be configured to control the second transceiver 46 to transmit one or more of temperature data, humidity data, light data, and engine position data. In some examples, the second processor 34 may be configured to receive data from the second transceiver 46.

Where the second transceiver 46 is configured to communicate data via a wireless link, the second transceiver 46 may advantageously enable rapid deployment of the apparatus 102 across a fleet of engine stands 14, 141, 142 without compromising the integrity of engine bags covering engines 12.

The second housing 48 is arranged to house the second processor 34, the second memory 36, the temperature sensor 38, the humidity sensor 40, the photodetector 42, the position sensor 44 and the second transceiver 46. For example, the second housing 48 may be a plastic case that has an internal cavity for housing the second processor 34, the second memory 36, the temperature sensor 38, the humidity sensor 40, the photodetector 42, the position sensor 44 and the second transceiver 46. The second housing 48 may be coupled to the engine stand 14, 141, 142 via one or more fasteners (such as screws, nuts and bolts, and so on) or via an adhesive.

It should be appreciated that in some examples, the apparatus 102 may comprise more than the first housing 32 and the second housing 48 for housing the above-mentioned sensors. For example, each of the GNSS sensor 28, the temperature sensor 38, the humidity sensor 40, the photodetector 42 and the position sensor 44 may be housed in a dedicated housing of their own.

The accessory 50 may be any accessory of the engine 12 or the engine stand 14, 141, 142. For example, the accessory 50 may be a toolbox that includes one or more tools for inspecting and/or maintaining the engine 12. By way of another example, the accessory 50 may be a tool for inspecting the engine 12 (such as a borescope) or for maintaining the engine 12 (such as a high-tension torque system for tightening and untightening bolt ends and/or nuts).

The third memory 54 stores a computer program 74 comprising computer readable instructions that, when read by the third processor 52, causes performance of the methods described herein. The computer program 74 may be software or firmware, or may be a combination of software and firmware. The computer program 74 may be stored on the non-transitory computer readable storage medium 70. The computer program 74 may be transferred from the non-transitory computer readable storage medium 70 to the third memory 54. In some examples, the computer program 74 may be transferred to the third memory 54 via a wireless signal or via a wired signal.

The third transceiver 56 may comprise any suitable communications circuitry that is configured to communicate data via a wireless link and/or via a wired link. In some examples, the third transceiver 56 may be a transmitter that is configured to transmit data. In other examples, the third transceiver 56 may include a transmitter and a receiver that are configured to transmit and receive data respectively. The third transceiver 56 may be configured to communicate over a network such as one or more of: a wide area network (WAN), a wireless wide area network (WWAN), a local area network (LAN) and a wireless local area network (WLAN). Additionally, or alternatively, the third transceiver 56 may be configured to communicate directly with another device (that is, without an intervening network between the third transceiver 56 and the other device).

The third transceiver 56 is configured to transmit a signal to indicate the presence of the accessory 50. For example, the third processor 52 may control the third transceiver 56 to transmit a signal that may be received by one or more of the first processor 18, the second processor 34 and the fourth processor 60 via their respective transceivers 30, 46, 64. Where one of the first processor 18, the second processor 34 and the fourth processor 60 receive the signal from the third transceiver 56, the receiving processor 18, 34 may record receipt of the signal in the first memory 26, the second memory 36 and the fourth memory 62 respectively, as the receipt of the signal may indicate the presence of the accessory 50 near the engine stand 14, 141, 142. In some examples, the apparatus 102 may comprise a further global navigation satellite system (GNSS) sensor (similar to the GNSS sensor 28) that is coupled to the accessory 50 and is configured to provide location data to the third processor 52. The third processor 52 may be configured control the third transceiver 56 to transmit the location data (which may be received by one or more of the first transceiver 30, the second transceiver 46 and the fourth transceiver 64).

The remote computer 58 may be remote from the engine stand 14, 141, 142 by being located in a different part of a building or facility to the engine stand 14, 141, 142. In other examples, the remote computer 58 may be remote from the engine stand 14, 141, 142 by being located in a different building, airport, city, county, state or country to the engine stand 14, 141, 142. The remote computer 58 is configured to receive data from one or more of the first transceiver 30, the second transceiver 46 and the third transceiver 56 and provide information to a user using the received data (for example, on the conditions experienced by the engine stand 14, 141, 142).

The fourth memory 62 stores a computer program 76 comprising computer readable instructions that, when read by the fourth processor 60, causes performance of the methods described herein. The computer program 76 may be software or firmware, or may be a combination of software and firmware. The computer program 76 may be stored on the non-transitory computer readable storage medium 70. The computer program 76 may be transferred from the non-transitory computer readable storage medium 70 to the fourth memory 62. In some examples, the computer program 76 may be transferred to the fourth memory 62 via a wireless signal or via a wired signal.

The fourth transceiver 64 may comprise any suitable communications circuitry that is configured to communicate data via a wireless link and/or via a wired link. In some examples, the fourth transceiver 64 may be a receiver that is configured to receive data. In other examples, the fourth transceiver 64 may include a transmitter and a receiver that are configured to transmit and receive data respectively. The fourth transceiver 64 may be configured to communicate over a network such as one or more of: a wide area network (WAN), a wireless wide area network (WWAN), a local area network (LAN) and a wireless local area network (WLAN). Additionally, or alternatively, the fourth transceiver 64 may be configured to communicate directly with another device (that is, without an intervening network between the fourth transceiver 64 and the other device).

The output device 66 may comprise any suitable device or devices that are configured to convey information to a user of the remote computer 58. For example, the output device 66 may comprise a display (such as a liquid crystal display (LCD) or an organic light emitting diode (OLED) display) that is configured to display information. By way of another example, the output device 66 may comprise a loudspeaker that is configured to convey information to a user via sound waves.

The fourth processor 60 is configured to control the output device 66 to convey information to the user of the remote computer 58. For example, the fourth processor 60 may control the output device 66 to convey one or more of: an acceleration value measured by the accelerometer 16, a location measured by the GNSS sensor 28, a temperature value measured by the temperature sensor 38, a humidity value measured by the humidity sensor 40, a light value measured by the photodetector 42, and an engine position measured by the position sensor 44.

FIG. 4 illustrates a side view of another apparatus 103. The apparatus 103 is similar to the apparatus 10, 101, 102 and where the features are similar, the same reference numerals are used. The apparatus 103 includes the engine stand 142, a gas turbine engine 12, the first housing 32 (housing the first processor 18, the first memory 68, the accelerometer 16, the GNSS sensor 28, and the first transceiver 30) and the second housing 48 (housing the second processor 34, the second memory 36, the temperature sensor 38, the humidity sensor 40, the photodetector 42, the position sensor 44 and the second transceiver 46).

The engine stand 142 comprises: a base frame 20, a first engine support frame 221, a second engine support frame 222, and a shock absorber 24 coupled between the base frame 20, the first engine support frame 221 and the second engine support frame 222. The base frame 20 is arranged to sit on the floor and may comprise wheels and/or castors that enable the engine stand 142 to be positioned on the floor (for example, by being pushed or pulled). The first engine support frame 221 is arranged to support an intermediate section of a core casing of the gas turbine engine 12 and may also be referred to as an engine cradle or inter-case support pylon. The second engine support frame 222 is arranged to support a turbine section of the core casing of the gas turbine engine 12 and may also be referred to as a turbine support pylon. The shock absorber 24 may comprise one or more of: springs, pneumatic shock absorbers, and hydraulic shock absorbers. The shock absorber 24 is configured to provide shock attenuation in the event that the engine 12 and/or the engine stand 142 are subject to a force.

In some examples, the engine stand 142 may additionally comprise an intermediate frame that is coupled between the shock absorber 24, the first engine support frame 221 and the second engine support frame 222. The intermediate frame may be rectangular or square and may be the same or a similar size to the base frame 20.

The gas turbine engine 12 is attached to the engine stand 142 via at least a first mounting point 78 and a second mounting point 80. The first and second mounting points 78, 80 are located and arranged to engage with suitable complementary features on the core casing to enable the gas turbine engine 12 to be releasably secured to the first and second engine support frames 221, 222. For example, bolts, dowels or other temporary fastenings may be used to couple the gas turbine engine 12 to the engine stand 142.

The first housing 32 may be coupled to the first engine support frame 221 or to the second engine support frame 222. The first housing 32 may be coupled at a location closer to the base frame 20 than the second housing 48. When the gas turbine engine 12 is covered by an engine bag, the location of the first housing 32 may result in the first housing 32 not being covered by the engine bag (that is, the first housing 32 is outside the engine bag). In other examples, the first housing 32 may be coupled to the intermediate frame of the engine stand 142.

The second housing 48 may be coupled to the first engine support frame 221 or to the second engine support frame 222. The second housing 48 may be coupled at a location farther away from the base frame 20 than the first housing 32. When the gas turbine engine 12 is covered by an engine bag, the location of the second housing 48 may result in the second housing 48 being covered by the engine bag (that is, the second housing 48 is inside the engine bag). Consequently, the second housing 48 may be coupled to the first or second engine support frame 221, 222 at locations that do not interfere with the operation of the engine stand 142, that represent the engine bag environment, and do not create a foreign objection damage (FOD) risk to the gas turbine engine 12 within the bag. In some examples, the second housing 48 may be coupled to the first engine support frame 221 within 500 mm of the first mounting point 78, or may be coupled to the second engine support frame 222 within 300 mm of the second mounting point 80.

FIGS. 5A and 5B illustrate rear and front views of an interface plate 82 according to an example. The interface plate 82 is configured to attach to the engine stand 14, 141, 142, and the first housing 32 is configured to couple to the engine stand 14, 141, 142 via the interface plate 82.

The interface plate 82 includes adhesive 84, magnets 86 and a leverage surface 88 on a rear face 90 to enable the interface plate 82 to be attached and removed from the engine stand 14, 141, 142. The interface plate 82 also includes tapped holes 92 in a front face 94 to allow the first housing 32 to be attached via screws. The interface plate 82 thus provides a robust anti-tamper mechanism for attaching the first housing 32 to the engine stand 14, 141, 142 that still enables a person to access the first housing 32 (for example, to allow battery replacement).

Figure 6:
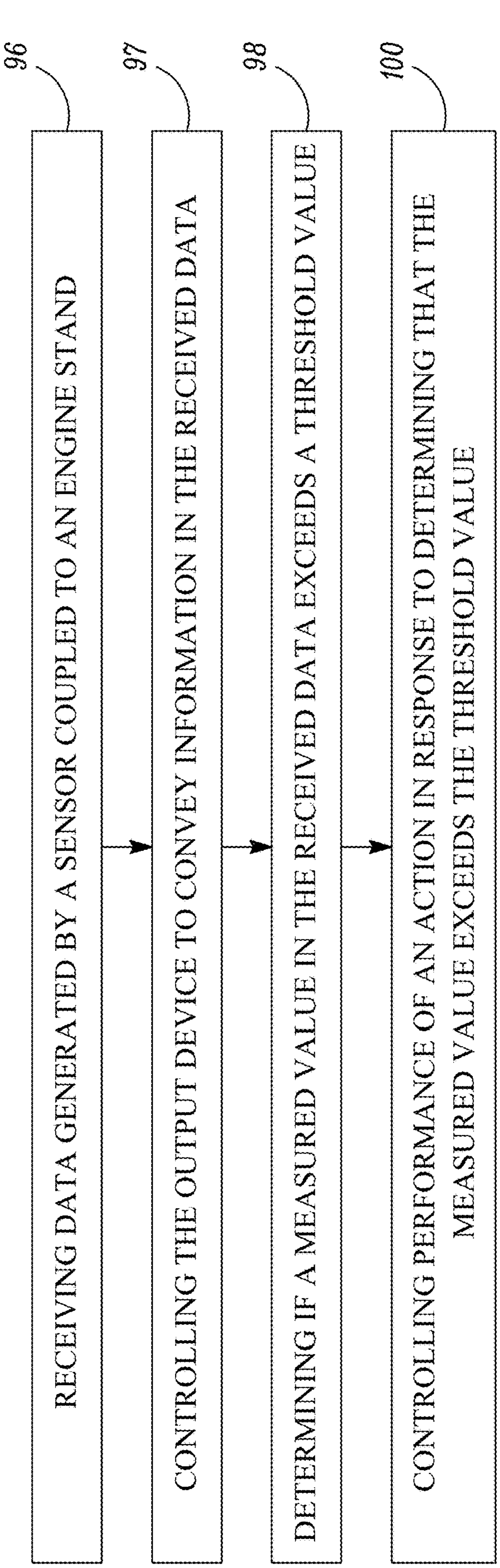
FIG. 6 illustrates a flow diagram of a method according to various example.

FIG. 6 illustrates a flow diagram of a method according to various examples. At block 96, the method includes receiving data generated by a sensor coupled to the engine stand 14, 141, 142. For example, the first processor 18 may receive one of more of: accelerometer data generated by the accelerometer 16, location data generated by the GNSS sensor 28, temperature data generated by the temperature sensor 38, humidity data generated by the humidity sensor 40, light data generated by the photodetector 42, engine position data generated by the position sensor 44. It should be appreciated that the temperature data, the humidity data, the light data and the engine position data are received by the first processor 18 via the first transceiver 30 and the second transceiver 46.

By way of another example, the fourth processor 60 may receive one of more of: accelerometer data generated by the accelerometer 16, location data generated by the GNSS sensor 28, temperature data generated by the temperature sensor 38, humidity data generated by the humidity sensor 40, light data generated by the photodetector 42, engine position data generated by the position sensor 44. The accelerometer data and the location data are received by the fourth processor 60 via the first transceiver 30 and the fourth transceiver 64. The temperature data, humidity data, the light data and the engine position data may be received by the fourth processor 60 via the first transceiver 30, or may be received without intervening processing by the first processor 18.

Where the fourth processor 60 receives one or more of the data mentioned in the preceding paragraph, the method may further comprise a block 97 of controlling the output device 66 to convey information in the received data to a user of the remote computer 58. For example, where the fourth processor 60 receives light data, the fourth processor 60 may control a display of the output device 66 to display a light value which may be monitored over a period of time to enable a user to understand the conditions being experienced by the engine stand 142. For example, where the light value is 100%, this may indicate that the engine stand 142 is positioned outside in sunshine. By way of another example, where the light value changes from 100% to 0% and returns to 100% over a twenty four hour period, this may indicate that the engine stand 142 is outside with the engine bag open. By way of a further example, where the light value is between 40% and 50%, this may indicate that the engine stand 142 is inside under artificial lights with the engine bag open. By way of another example, where the light value is 0%, this may indicate that the engine bag is closed and the engine stand 142 may be inside or outside.

In some examples, the second processor 34 may receive one of more of: temperature data generated by the temperature sensor 38, humidity data generated by the humidity sensor 40, light data generated by the photodetector 42, engine position data generated by the position sensor 44.

At block 98, the method includes determining if a measured value in the received data exceeds a threshold value. As used herein, the word 'exceed' means to go beyond the threshold value and may include values greater than the threshold value, or values that are less than the threshold value.

For example, one of the first processor 18, the second processor 34 and the fourth processor 60 may determine if a measured acceleration value is greater than a threshold acceleration value. By way of another example, one of the first processor 18, the second processor 34 and the fourth processor 60 may determine if a measured location falls outside of a threshold location. The threshold location may be defined by a perimeter around an predetermined location. For example, the predetermined location may be the location of a maintenance facility. By way of a further example, one of the first processor 18, the second processor 34 and the fourth processor 60 may determine if a temperature value is greater than a threshold temperature value. By way of another example, one of the first processor 18, the second processor 34 and the fourth processor 60 may determine if a measured humidity value is greater than a threshold humidity value. By way of a further example, one of the first processor 18, the second processor 34 and the fourth processor 60 may determine if a measured light value is greater than a threshold light value. By way of another example, one of the first processor 18, the second processor 34 and the fourth processor 60 may determine if a measured engine position value is less than a threshold engine position value.

At block 100, the method includes controlling performance of an action in response to determining that the measured value exceeds the threshold value. For example, the fourth processor 60 may control the output device 66 to provide an output in response to the determining that the measured value exceeds the threshold value (for example, by controlling a loudspeaker of the output device 66 to provide an audible alarm or by controlling a display of the output device 66 to provide a visual alarm). In some examples, the first processor 18 and/or the second processor 34 may also be connected to an output device such as a loudspeaker, and the first processor 18 and/or the second processor 34 may also control their respective output devices to provide an output (such as an audible alarm).

Additionally, or alternatively, one or more of the first processor 18, the second processor 34 and the fourth processor 60 may control storage of the measured value in the first memory 26, the second memory 36, and the fourth memory 62 respectively in a read-only, undeletable format when it is determined that the measured value exceeds the threshold value.

In more detail, where it is determined that a measured acceleration value is greater than a threshold acceleration value, this may indicate that the engine stand 14, 141, 142 has received an impact or shock and that the engine stand 14, 141, 142 or the engine 12 may be damaged. Where it is determined that a measured location falls outside of a threshold location, this may indicate that the engine stand 14, 141, 142 has been moved to an unexpected location which may indicate theft of the engine stand. Where it is determined that a temperature value is greater than a threshold temperature value, this may indicate that the engine stand 14, 141, 142 is in proximity to a fire. Where it is determined that a measured humidity value is greater than a threshold humidity value, this may indicate that an engine bag covering the engine 12 is open and that the engine 12 is exposed to rain, mist or fog. Where it is determined that a measured light value is greater than a threshold light value, this may indicate that an engine bag covering the engine 12 is open and that the engine 12 is exposed to the environment. Where it is determined that a measured engine position value is less than a threshold engine position value, this may indicate that the engine 12 has been unexpectedly removed from the engine stand 14, 141, 142.

The method illustrated in FIG. 6 and described above may be advantageous in that an alarm may be triggered when the engine stand 14, 141, 142 (and therefore the engine 12) experiences an unexpected condition. This alarm may enable an airline or a maintenance facility to inspect the engine stand 14, 141, 142 and the engine 12 in a timely manner to determine whether the engine stand 14, 141, 142 and the engine 12 are damaged.

Various examples have been described, each of which comprise various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. An apparatus for supporting at least a part of an engine, the apparatus comprising:

an engine stand configured to support at least a part of an engine;

an accelerometer coupled to the engine stand and configured to measure acceleration of the engine stand and generate accelerometer data;

a first processor coupled to the engine stand configured to receive the accelerometer data from the accelerometer;

a first memory, the first processor being configured to control the first memory to store the received accelerometer data; and a first transmitter, the first processor being configured to control the first transmitter to transmit the accelerometer data.

2. The apparatus as claimed in claim 1, wherein the engine stand comprises: a base frame, an engine support frame, and a shock absorber coupled between the base frame and the engine support frame, the accelerometer being coupled to the engine support frame.

3. The apparatus as claimed in claim 1, further comprising a remote computer configured to receive the accelerometer data from the first transmitter, the remote computer being configured to perform an action in response to the measured acceleration exceeding a threshold acceleration value.

4. The apparatus as claimed in claim 1, further comprising a global navigation satellite system (GNSS) sensor coupled to the engine stand, the global navigation satellite system sensor being configured to determine a location of the engine stand.

5. The apparatus as claimed in claim 1, further comprising a first housing configured to house at least the accelerometer and the first processor.

6. The apparatus as claimed in claim 5, further comprising an interface plate configured to attach to the engine stand, the first housing being configured to couple to the engine stand via the interface plate.

7. The apparatus as claimed in claim 1, further comprising a humidity sensor coupled to the engine stand, the humidity sensor being configured to measure humidity at the engine stand and generate humidity data.

8. The apparatus as claimed in claim 7, further comprising: a second transmitter; and a second processor configured to receive the humidity data from the humidity sensor and control the second transmitter to transmit the humidity data.

9. The apparatus as claimed in claim 1, further comprising a temperature sensor coupled to the engine stand, the temperature sensor being configured to measure temperature at the engine stand, and generate temperature data.

10. The apparatus as claimed in claim 1, further comprising a photodetector coupled to the engine stand and configured to measure optical light at the engine stand, and generate light data.

11. The apparatus as claimed in claim 1, further comprising a position sensor coupled to the engine stand and configured to measure a parameter associated with the presence of an engine being supported by the engine stand and generate engine position data.

12. The apparatus as claimed in claim 11, wherein the position sensor comprises an identification reader that is configured to read a passive wireless tag coupled to the engine using near-field communication (NFC), radio frequency identification (RFID) or ultra-wide band (UWB).

13. The apparatus as claimed in claim 1, further comprising: an accessory of the engine stand; and a third transmitter coupled to the accessory, the third transmitter being configured to transmit a signal to indicate the presence of the accessory.

* * * * *